United States Patent
Boettcher et al.

(10) Patent No.: US 10,589,375 B2
(45) Date of Patent: Mar. 17, 2020

(54) FRICTION STIR WELD TOOL AND METHOD

(71) Applicant: Honda Motor Co., Ltd., Tokyo (JP)

(72) Inventors: Eric J. Boettcher, Columbus, OH (US); Alan P. Seid, Dublin, OH (US)

(73) Assignee: Honda Motor Co., Ltd., Tokyo (JP)

( * ) Notice: Subject to any disclaimer, the term of this patent is extended or adjusted under 35 U.S.C. 154(b) by 32 days.

(21) Appl. No.: 15/169,808

(22) Filed: Jun. 1, 2016

(65) Prior Publication Data

US 2016/0354860 A1 Dec. 8, 2016

Related U.S. Application Data

(60) Provisional application No. 62/169,686, filed on Jun. 2, 2015.

(51) Int. Cl.
| | |
|---|---|
| *B23K 20/12* | (2006.01) |
| *B23K 20/227* | (2006.01) |
| *B23K 20/233* | (2006.01) |
| *B23K 103/10* | (2006.01) |
| *B23K 103/20* | (2006.01) |
| *B23K 101/18* | (2006.01) |
| *B23K 103/04* | (2006.01) |

(52) U.S. Cl.
CPC ........ *B23K 20/1255* (2013.01); *B23K 20/227* (2013.01); *B23K 20/2275* (2013.01); *B23K 20/2336* (2013.01); *B23K 2101/18* (2018.08); *B23K 2103/04* (2018.08); *B23K 2103/10* (2018.08); *B23K 2103/20* (2018.08)

(58) Field of Classification Search
None
See application file for complete search history.

(56) References Cited

U.S. PATENT DOCUMENTS

| | | | |
|---|---|---|---|
| 6,676,004 B1 * | 1/2004 | Trapp | B23K 20/1255 228/112.1 |
| 8,016,179 B2 | 9/2011 | Burford | |
| 2005/0156010 A1 * | 7/2005 | Flak | B23K 20/1255 228/112.1 |
| 2007/0152015 A1 * | 7/2007 | Burton | B23K 20/1255 228/2.1 |
| 2009/0120995 A1 | 5/2009 | Hallinan et al. | |
| 2013/0206817 A1 * | 8/2013 | Tavares | B23K 20/126 228/112.1 |
| 2014/0326392 A1 * | 11/2014 | Silvanus | B23K 20/1255 156/73.5 |
| 2014/0361069 A1 | 12/2014 | Silvanus et al. | |

* cited by examiner

*Primary Examiner* — Devang R Patel
(74) *Attorney, Agent, or Firm* — Rankin, Hill & Clark LLP

(57) ABSTRACT

A friction stir welding tool and method for forming a friction stir weld joint includes a rotatable body having a rotatable shoulder for maintaining surface contact and maintaining plunge depth and a rotatable pin extending from the rotatable shoulder. The rotatable pin is integrally formed with the rotatable shoulder. The tool further includes a stationary body annularly disposed around the rotatable body. The stationary body has a stationary shoulder annularly disposed around the rotatable shoulder for further maintaining surface contact and managing plunge depth.

14 Claims, 4 Drawing Sheets

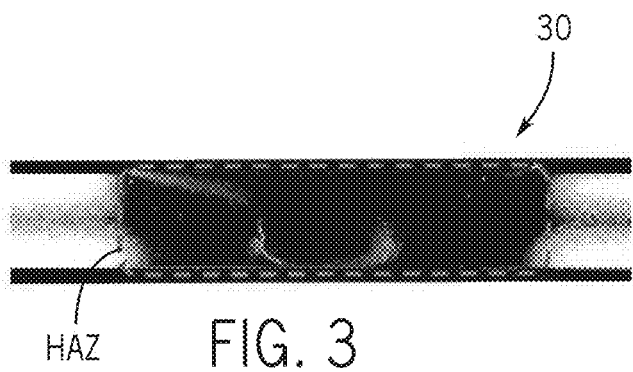
HAZ  FIG. 3
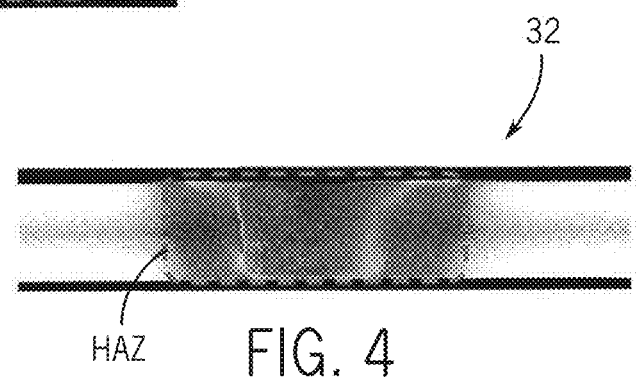
HAZ  FIG. 4
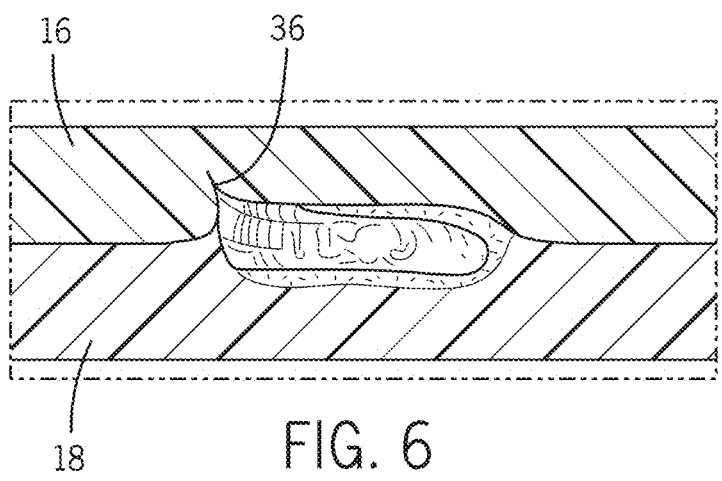
FIG. 6
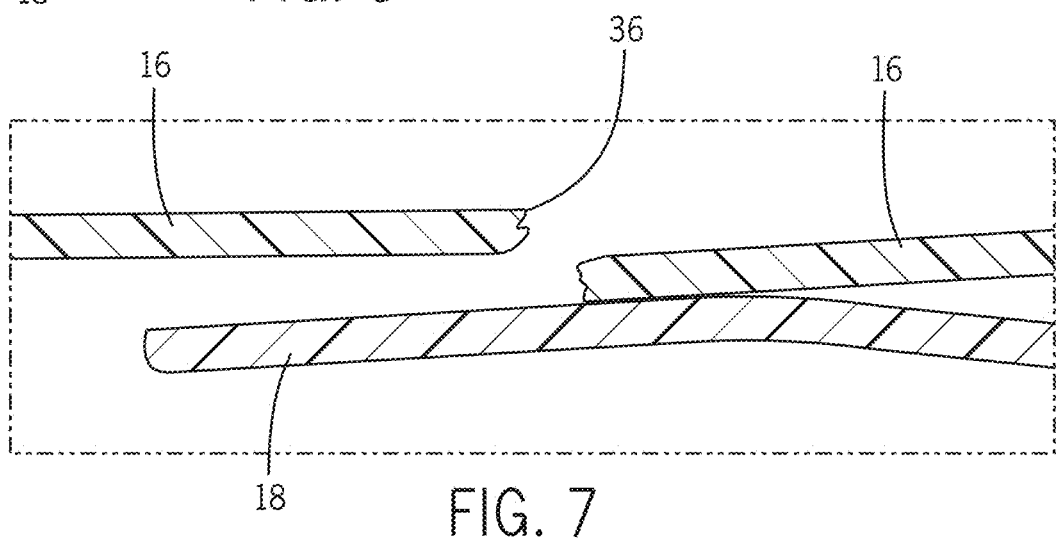
FIG. 7

FRICTION STIR WELD TOOL AND METHOD

The present application claims priority to U.S. Prov. Patent App. Ser. No. 62/169,686, filed Jun. 2, 2015, the entirety of which is expressly incorporated herein.

BACKGROUND

Friction stir welding is currently being used in many industries for the joining of metallic materials. One use for friction stir welding is to weld a joint between overlapping sheets of metallic material. With reference to FIG. 1, a conventional friction stir welding tool 10 is schematically shown including a body 12 having an integral tip 14 extending therefrom. Both the body 12 and tip 14 are together rotatable about an axis for friction stir welding a joint between two sheets 16, 18 of overlapping metallic sheet material, such as two sheets of steel, two sheets of aluminum, one sheet of steel and one sheet of aluminum, etc. Problems associated with such conventional friction stir welding tools include controlling local heating of the sheets 16, 18 and providing uniform heating at the joint between the sheets 16, 18.

To address these concerns, static shoulder friction stir weld tools were developed. In particular, the development of static shoulder friction tools was out of a need to provide more uniform heating through the thickness, improve surface quality and improve weld quality in friction stir welds. With reference to FIG. 2, a friction stir welding tool 20 is schematically shown including a rotating pin 22 disposed in a non-rotating or static body 24. The static body 24 includes a static shoulder 26 that slides across the surface 16a of the top sheet 16, while the rotating pin 22 plunges and spins into the sheet 16.

FIGS. 3 and 4 show a relative comparison between a friction stir welding joint using the friction stir welding tool 10 of FIG. 1 and the friction stir welding tool 20 of FIG. 2. In particular, FIG. 3 shows a weld joint 30 created by the tool 10 of FIG. 1 and FIG. 4 shows a weld joint 32 created by the tool 20 of FIG. 2. The comparison of FIG. 3 versus FIG. 4 shows that the tool 20 having the static shoulder 26 reduces the overall size of the heat affected zone (HAZ), which is predicted to better contribute to retaining base substrate properties. An additional benefit is that the mixing occurs uniformly from the shoulder 26 down through the depth of plunge of the pin 22 in the joint shown in FIG. 4. However, one drawback of the tool 20 is that while providing preferred mixing, the same mixing characteristic has been identified as creating an upward material flow along the pin 22 which forces highly plasticized, heated material (e.g., aluminum) into and beyond the pin bearing 34, which can foul the internal hardware of the tool 20 and/or cause significant maintenance issues for the tool 20.

In response to this challenging flow path, with reference to FIG. 5, pin geometry has been modified to limit mixing only in the overlap area between the sheets 16, 18. In particular, the tool 20' of FIG. 5 includes a pin 22' having a fluted end 22a'. While the fluted end 22a' does reduce or eliminate the material flowing upwards into the tool 20', this arrangement does not allow for uniform mixing near the surface 16a of the sheet 16. More particularly, the resulting joint between the sheets 16, 18 created by the tool 20' tends to have connectivity or weld defects (e.g., inclusion of an undesirable hook feature 36, non-uniform mixing, etc.). This is best shown FIGS. 6 and 7. In particular, shown in FIG. 6, non-uniform mixing occurs due to the fluted end 22', which mixes the middle lower half of the material. The undesirable hook 36 provides the initiation point of tensile failure for the joint between the sheets 16, 18 as best illustrated in FIG. 7.

SUMMARY

According to one aspect, a friction stir welding tool for forming a friction stir weld joint includes a rotatable body having a rotatable shoulder for maintaining surface contact and maintaining plunge depth and a rotatable pin extending from the rotatable shoulder. The rotatable pin is integrally formed with the rotatable shoulder. The tool further includes a stationary body annularly disposed around the rotatable body. The stationary body has a stationary shoulder annularly disposed around the rotatable shoulder for further maintaining surface contact and managing plunge depth.

According to another aspect, a friction stir weld method is provided for forming a friction stir weld joint. More particularly, according to the method, a first sheet is at least partially overlapped onto a second sheet. A rotatable pin is inserted into at least the first sheet. A surface of the first sheet is engaged with a rotatable shoulder integrally formed with the rotatable pin to manage plunge depth of the rotatable pin. The rotatable pin extends from the rotatable shoulder. The surface of the first sheet is also engaged with a stationary shoulder annularly disposed around the rotatable shoulder to further manage plunge depth. The rotatable pin is moved along a predefined weld path to form the friction stir weld joint between the first sheet and the second sheet.

BRIEF DESCRIPTION OF THE DRAWINGS

FIG. 3 illustrates a weld joint created by the tool of FIG. 1.

FIG. 4 illustrates a weld joint created by the tool of FIG. 2.

FIG. 6 illustrates a weld joint created by the tool of FIG. 5.

FIG. 7 illustrates failure at the weld joint of FIG. 6.

DETAILED DESCRIPTION

Figure 1:
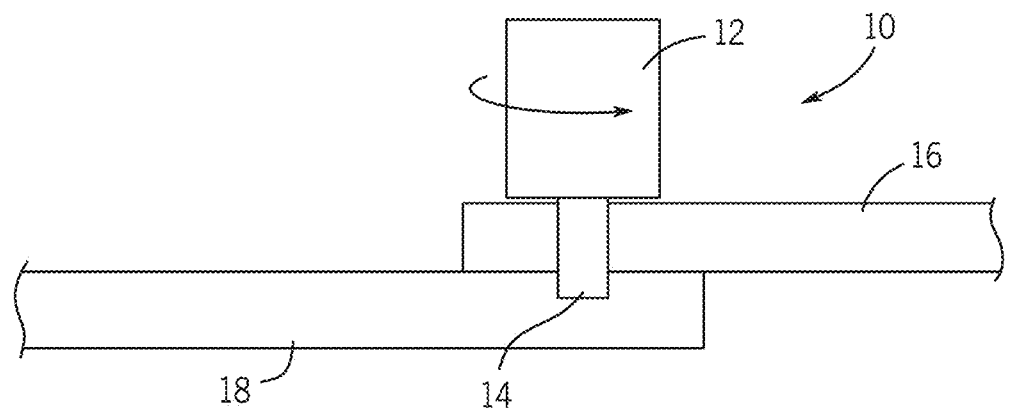
FIG. 1 is a schematic view of a friction stir welding tool having a rotatable body and pin formed integrally with one another.
Figure 2:
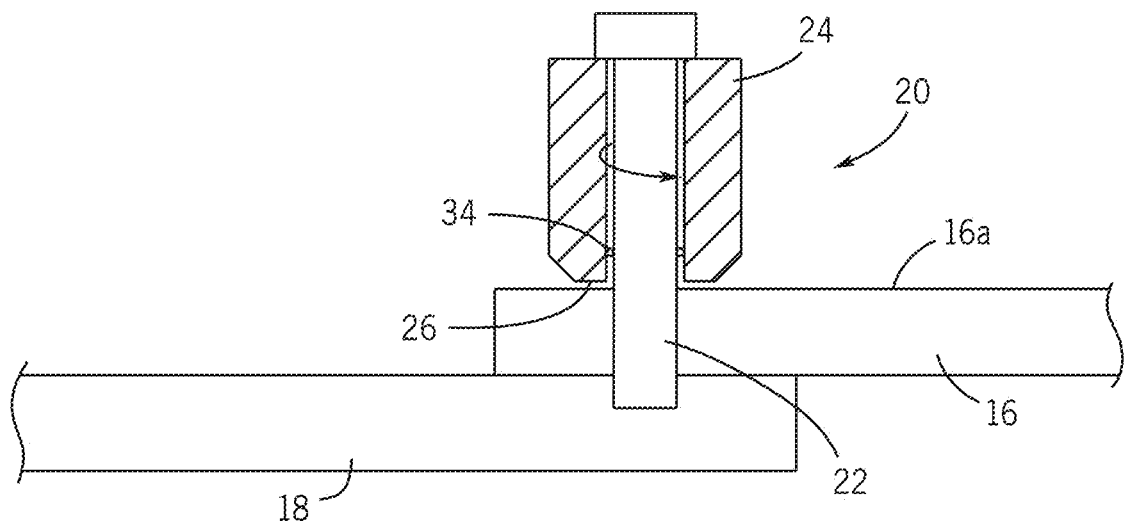
FIG. 2 is a schematic view of a friction stir welding tool having a pin rotatably disposed within a stationary body.
Figure 5:
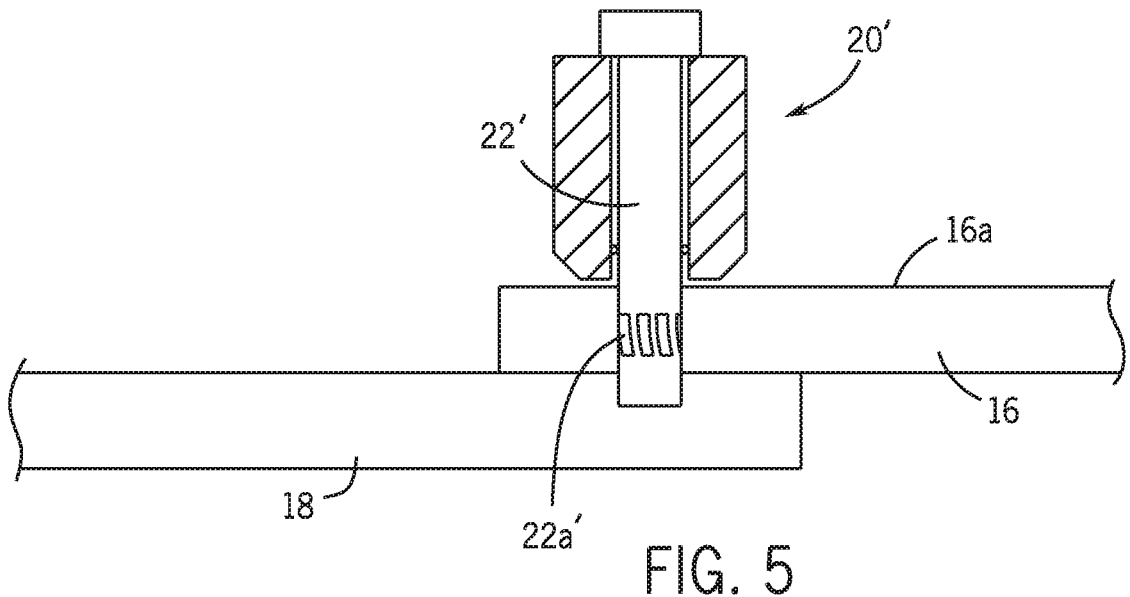
FIG. 5 schematically illustrates a friction stir welding tool that is similar to FIG. 2 but includes a fluted end on the rotatable pin.
Figure 8:
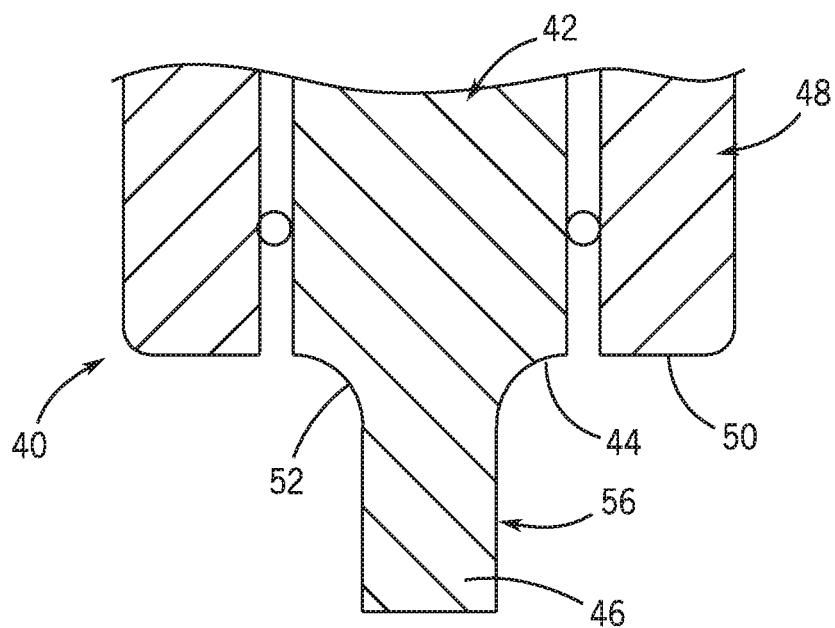
FIG. 8 schematically illustrates, in part, a friction stir welding tool according to an exemplary embodiment.

Referring now to the drawings, wherein the showings are purposes of illustrating one or more exemplary embodiments and not for purposes of limiting the same, FIG. 8 schematically illustrates a friction stir weld tool 40 for forming a friction stir weld joint according to an exemplary embodiment. As shown, the tool 40 includes a rotatable body 42 having a rotatable shoulder 44 for maintaining surface contact and managing plunge depth as is described in more detail below. The rotatable body 42 also has a rotatable pin 46 extending from the rotatable shoulder 44. As shown, the rotatable pin 46 is integrally formed with the rotatable shoulder 44. The tool 40 also includes a stationary or static body 48 annularly disposed around the rotatable body 42. The stationary body 48 has a stationary or static shoulder 50 annularly disposed around the rotatable shoulder 44 for further maintaining surface contact and managing plunge depth as will be described in more detail below. In particular, a plunge depth into a sheet of material by the pin 46 is limited by the shoulders 44, 50. Optionally, the pin 46 can include fins or flutes (e.g., flutes 22a' shown in FIG. 5).

The rotatable body 42 can further include a rotatable annular radius or fillet 52 disposed between the rotatable shoulder 44 and the rotatable pin 46. The rotatable annular fillet 52, as shown, is integrally formed with the rotatable shoulder 44 and the rotatable pin 46. The rotatable annular fillet 52 can be appropriately sized to urge mixed material from sheets 16, 18 (i.e., sheets to be joined at a friction stir weld joint) to move radially outwardly. The inclusion of the static shoulder 50 functions to limit travel of the mixed material in the radial outward direction. Also, the shoulders 44, 50 can be relatively sized and arranged to urge the mixed material axially in a direction away from the stationary and rotatable bodies 48, 50 after the mixed material moves for a limited amount in a radially outward direction.

Figure 9:
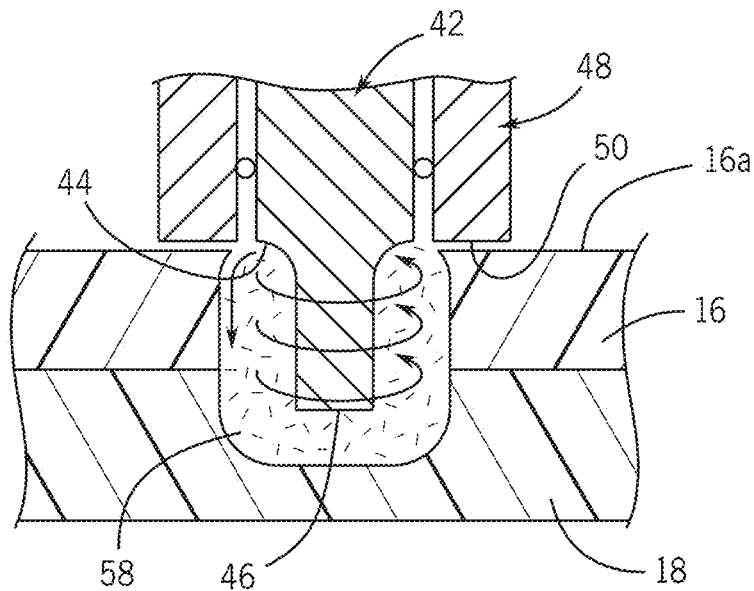
FIG. 9 schematically illustrates material flow during welding of a weld joint with the tool of FIG. 8.

More particularly, the surface 56 defined by the rotatable pin 46, the annular fillet 52 and the shoulder 44 provides a continuous surface that allows plasticized material from the sheets 16, 18 to first move axially along the pin 46 toward the rotatable body 42 and then to be redirected by the fillet 52 along the shoulder 44 in a radially outward direction. Finally, the static shoulder 50 causes the plasticized material to cease moving radially outwardly and move axially away from the rotatable body 42 (downward in FIG. 9). This flow path is shown in FIG. 9 wherein mixing area 58 represents the mixed and plasticized materials of the sheets 16 and 18.

The tool 40 thus provides a shoulder 44, 52 that is partially static (i.e., static shoulder 50) and partially rotating (i.e., rotatable shoulder 44). This eliminates or at least reduces the likelihood of: a hook forming (e.g., hook 36 of FIG. 6) and/or non-uniformed mixing, thereby creating a weld joint with a higher lap shear strength and weld quality. An additional feature of the stationary shoulder 50 is that it prevents plasticized material from flowing too far along the surface 16a of the sheet 16. Accordingly, the relatively small mixing area 58 is provided but is uniformly mixed from approximately a surface 16a of the sheet 16 down through the sheet 16 and deep into the sheet 18.

Figure 10:
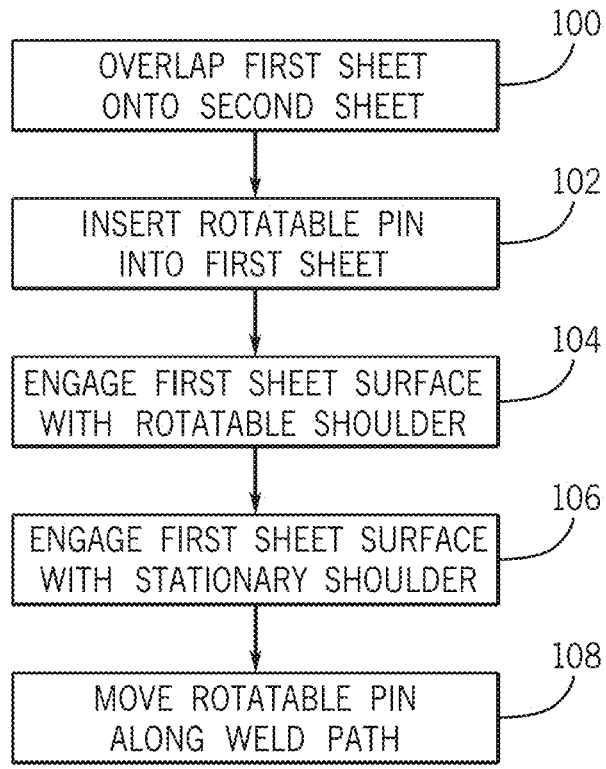
FIG. 10 is a block diagram illustrating a friction stir weld method according to an exemplary embodiment.

With reference now to FIG. 10, a friction stir weld method for forming a friction stir weld joint will be described according to an exemplary embodiment. In particular, the method will be described in reference to the tool 40 described hereinabove, but those skilled in the art will recognize that the method could be used with other tools. At 100, the first sheet 16 is at least partially overlapped onto the second sheet 18. At 102, the rotatable pin 46 is inserted into at least the first sheet 16. At 104, the surface 16a of the first sheet 16 is engaged with the rotatable shoulder 44, which is integrally formed with the rotatable pin 46, to manage plunge depth of the rotatable pin 46. That is, the rotatable shoulder 44 limits the axial travel of the tool 40 into the sheet 16 or sheets 16 and 18. As already mentioned, the rotatable pin 46 extends from the rotatable shoulder 44 and both are integrally formed together.

At the same time the first sheet surface 16a is engaged with the rotatable shoulder 44, at 106, the surface 16a of the first sheet 16 is also engaged with the stationary shoulder 50 to further manage plunge depth. As already mentioned, the stationary shoulder 50 is annularly disposed around the rotatable shoulder 44. At 108, the rotatable pin 46 is moved along a predefined weld path (not shown) to form the friction stir weld joint between the first sheet 16 and the second sheet 18. During 108, the shoulders 44, 50 are maintained in contact with the surface 16a of the sheet 16.

Inserting the rotatable pin 46 into at least the first sheet 16 at 102 can include inserting the rotatable annular fillet 52 disposed between the rotatable shoulder 44 and the rotatable pin 46 into the first sheet 16. As mentioned, the rotatable annular fillet 52 is integrally formed with the pin 46 and the rotatable shoulder 44. Movement and mixing of the plasticized material of the sheet 16, 18 can occur as described above in reference to the tool 40, particularly with reference to FIG. 9.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A friction stir weld tool for forming a friction stir weld joint, the tool comprising:
   a rotatable body having a rotatable shoulder for maintaining surface contact and managing plunge depth, a rotatable pin extending from the rotatable shoulder and integrally formed with the rotatable shoulder, and a rotatable annular fillet arranged between the rotatable shoulder and the rotatable pin; and
   a stationary body annularly disposed around the rotatable body, the stationary body having a stationary shoulder;
   wherein the rotatable body is separated from the stationary body by a gap such that surfaces of the rotatable body and the stationary bode do not contact each other;
   wherein a surface of the stationary shoulder that is perpendicular to an axis of rotation of the rotatable body, and an edge of a surface of the rotatable shoulder that is closest to the gap, are both contained in a plane that is perpendicular to the axis of rotation; and
   wherein the rotatable annular fillet is a concave wall that extends directly from the rotatable pin directly to the rotatable shoulder, the concave wall continually extending away from a tip of the rotatable pin in a direction parallel to the axis of rotation as it extends radially outward away from the axis of rotation.

2. The friction stir weld tool of claim 1, wherein the rotatable annular fillet is integrally formed with the rotatable shoulder and the rotatable pin.

3. The friction stir weld tool of claim 1, wherein:
   a surface of the rotatable pin, a surface of the rotatable annular fillet, and a surface of the rotatable shoulder collectively provide a continuous smooth surface of the rotatable body.

4. The friction stir weld tool of claim 1, wherein a surface of the rotatable annular fillet and a surface of the rotatable shoulder form a continuous smooth surface.

5. The friction stir weld tool of claim 1 wherein the rotatable pin includes fins or flutes.

6. The friction stir weld tool of claim 1, wherein:
   when forming a friction stir weld joint, the rotatable shoulder and the rotatable pin urge mixed material at the friction stir weld joint to move radially outwardly; and when forming a friction stir weld joint, the stationary shoulder inhibits travel of said mixed material at the friction stir weld joint from moving radially outwardly.

7. The friction stir weld tool of claim 1, wherein the rotatable pin extends from a center of the rotatable shoulder.

8. The friction stir weld tool of claim 1, wherein:
a surface of the rotatable pin is disposed below the rotatable annular fillet on an opposite side of the rotatable annular fillet relative to the rotatable shoulder, and
a surface of the rotatable pin, a surface of the rotatably annular fillet, and a surface of the rotatable shoulder provide a continuous smooth surface that, when forming a friction stir weld joint, allows plasticized material at the friction stir weld joint to first move axially along the rotatable pin toward the rotatable body and then subsequently to be redirected by the rotatable fillet along the surface of the rotatable shoulder in a radially outward direction.

9. The friction stir weld tool of claim 8 wherein when forming a friction stir weld joint, the stationary shoulder then inhibits movement of the plasticized material at the friction stir weld joint from moving further in the radially outward direction.

10. A friction stir weld tool for forming a friction stir weld joint, comprising:
a rotatable body including a rotatable shoulder, a rotatable pin extending from a center of the rotatable shoulder, and a rotatable annular fillet arranged annularly between the rotatable shoulder and the rotatable pin; and
a stationary body annularly arranged about the rotatable body, the stationary body having a stationary shoulder;
wherein the rotatable body is separated from the stationary body by a gap such that surfaces of the rotatable body and the stationary body do not contact each other;
wherein a surface of the stationary shoulder that is perpendicular to an axis of rotation of the rotatable body, and an edge of a surface of the rotatable shoulder that is closest to the gap, are both contained in a plane that is perpendicular to the axis of rotation; and
wherein the rotatable annular fillet is a concave wall that extends directly from the rotatable pin directly to the rotatable shoulder, the concave wall continually extending away from a tip of the rotatable pin in a direction parallel to the axis of rotation as it extends radially outward away from the axis of rotation.

11. The friction stir weld tool of claim 10, wherein when forming a friction stir weld joint, the rotatable shoulder and the stationary shoulder contact an upper surface of an upper sheet that is to be joined to a lower sheet at the friction stir weld joint.

12. The friction stir weld tool of claim 11, wherein when forming a friction stir weld joint, the rotatable shoulder and the stationary shoulder limit plunge depth of the rotatable body and the stationary body into the upper surface of the upper sheet.

13. The friction stir weld tool of claim 10, wherein the rotatable annular fillet, the rotatable shoulder, and the rotatable pin are continuous and contiguous.

14. The friction stir weld tool of claim 10 wherein the rotatable pin includes fins or flutes.

* * * * *